(12) United States Patent
Haslach

(10) Patent No.: US 10,207,790 B2
(45) Date of Patent: Feb. 19, 2019

(54) CHANGEABLE WING PROFILE

(71) Applicant: Airbus Defence and Space GmbH, Ottobrunn (DE)

(72) Inventor: Horst Haslach, Geretsried (DE)

(73) Assignee: AIRBUS DEFENCE AND SPACE GMBH, Ottobrunn (DE)

( * ) Notice: Subject to any disclaimer, the term of this patent is extended or adjusted under 35 U.S.C. 154(b) by 82 days.

(21) Appl. No.: 14/905,109

(22) PCT Filed: Jul. 10, 2014

(86) PCT No.: PCT/DE2014/000348
§ 371 (c)(1),
(2) Date: Jan. 14, 2016

(87) PCT Pub. No.: WO2015/007259
PCT Pub. Date: Jan. 22, 2015

(65) Prior Publication Data
US 2016/0159456 A1   Jun. 9, 2016

(30) Foreign Application Priority Data

Jul. 17, 2013   (DE) .................. 10 2013 011 917

(51) Int. Cl.
*B64C 3/48* (2006.01)
*B64C 9/00* (2006.01)
*B64C 13/24* (2006.01)

(52) U.S. Cl.
CPC .................. *B64C 3/48* (2013.01); *B64C 9/00* (2013.01); *B64C 13/24* (2013.01); *Y02T 50/145* (2013.01)

(58) Field of Classification Search
CPC ..... B64C 2003/142; B64C 3/185; B64C 3/26; B64C 3/44; B64C 3/48; B64C 3/50;
(Continued)

(56) References Cited

U.S. PATENT DOCUMENTS 1,341,758 A   6/1920   Humphrey
1,747,367 A   12/1928   Evans et al.
(Continued)

FOREIGN PATENT DOCUMENTS

DE   10317258 B4   11/2004
DE   102004062998 A1   7/2006
(Continued)

OTHER PUBLICATIONS

German Patent Office, German Search Report for German Patent Application No. 10 2013 011 917.0 dated Mar. 19, 2014.
(Continued)

*Primary Examiner* — Richard R. Green
*Assistant Examiner* — Brady W Frazier
(74) *Attorney, Agent, or Firm* — Lorenz & Kopf LLP

(57) ABSTRACT

This relates to changes in wing profiles. In order to make available an aerodynamic structure that can be variably adjusted and changed with respect to the wing profile, it is provided that an aerodynamic structure for a wing or rudder arrangement of an aircraft comprises a support structure and an outer skin. The support structure comprises a fixed spar in the longitudinal direction, which extends from a root area to an outer end area. The support structure also comprises several adaptive framework segments in the transverse direction, which each consist of a plurality of strung together triangular compartments, which are formed by fixed-length guide elements and adjustable-length guide elements The framework segments are joined to the fixed spar. At least one side of a portion of the triangular compartments comprises one of the adjustable guide elements, so that the shape of the framework segments can be adjusted.

13 Claims, 4 Drawing Sheets

(58) Field of Classification Search
CPC .. B64C 3/52; B64C 9/00; B64C 13/24; Y02T 50/145
USPC .......................................................... 244/219
See application file for complete search history.

(56) References Cited

U.S. PATENT DOCUMENTS

| | | | | |
|---|---|---|---|---|
| 1,710,672 | A | * | 4/1929 | Bonney ..................... B64C 3/52 244/215 |
| 1,747,637 | A | * | 2/1930 | Larsen ..................... B64C 3/48 244/219 |
| 1,846,146 | A | * | 2/1932 | Rocheville ................ B64C 3/48 244/215 |
| 6,138,957 | A | | 10/2000 | Natasi et al. |
| 8,418,967 | B2 | * | 4/2013 | Hemmelgarn ............ B64C 3/48 244/123.1 |
| 2006/0145029 | A1 | * | 7/2006 | Lonsinger ............... B64C 3/185 244/219 |
| 2007/0152106 | A9 | * | 7/2007 | Perez-Sanchez ......... B64C 3/48 244/219 |
| 2010/0224734 | A1 | | 9/2010 | Grip |
| 2013/0099063 | A1 | * | 4/2013 | Grip ....................... B64D 27/24 244/219 |

FOREIGN PATENT DOCUMENTS

| | | |
|---|---|---|
| DE | 10325950 A1 | 1/2008 |
| EP | 1128072 A1 | 8/2001 |
| FR | 574500 A | 7/1924 |

OTHER PUBLICATIONS

International Searching Authority, International Search Report for International Patent Application No. PCT/DE2014/000348 dated Jan. 15, 2015.
German Patent Office, German Office Action for German Patent Application No. 10 2013 011 917.0 dated Mar. 19, 2014.
International Searching Authority, International Search Report for International Patent Application No. PCT/DE2014/000348 dated Jan. 14, 2015.

* cited by examiner

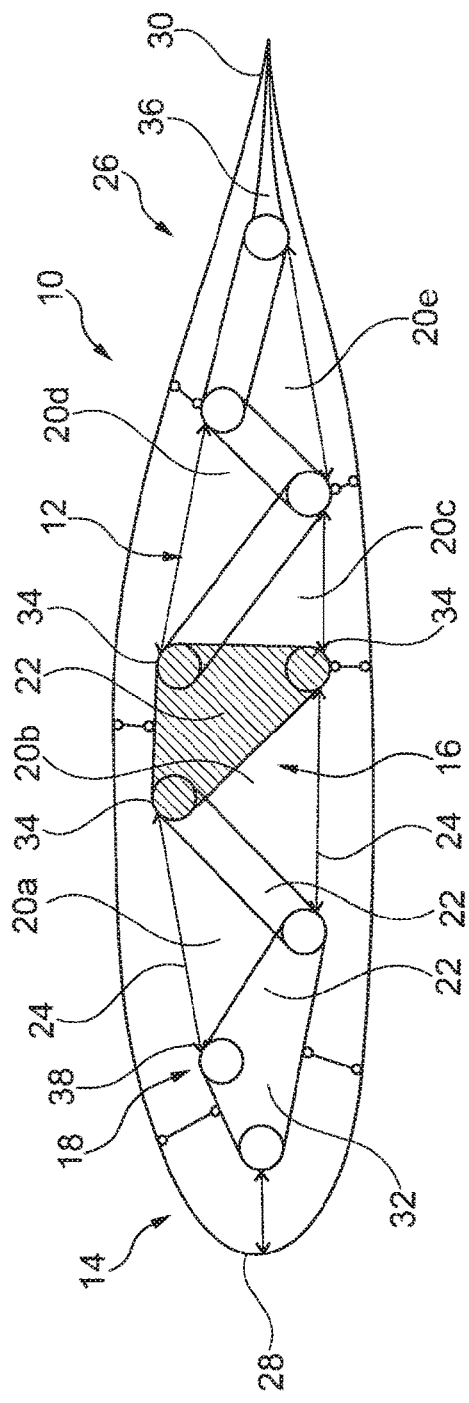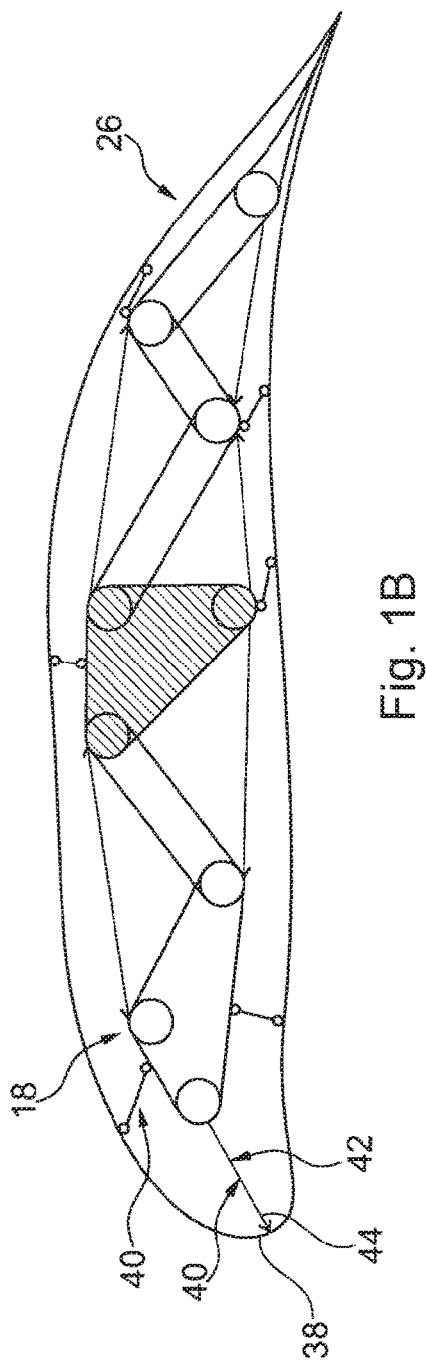
Fig. 1A
Fig. 1B

CHANGEABLE WING PROFILE

CROSS-REFERENCE TO RELATED APPLICATION

This application claims priority to International Patent Application No. PCT/DE2014/00348, filed Jul. 10, 2014, which claims priority to German Patent Application No. 10 2013 011 917.0, filed Jul. 17, 2013, which is incorporated herein by reference in its entirety.

TECHNICAL FIELD

The present embodiment relates to changes in wing profiles, and in particular relates to an aerodynamic structure for a wing or rudder arrangement of an aircraft, an aircraft, a method for adjusting an outer contour of an aerodynamic structure for a wing or rudder arrangement, and the use of an aerodynamic structure in an aircraft.

BACKGROUND

For example, rudders or rudder segments are provided in wing and control surfaces for control purposes. Additional flaps are also used for adjusting the profile to aerodynamic conditions, for example in the starting phase, during cruise flight, or even in the landing phase. Both the use of rudder elements and the use of additional flaps serves to change the aerodynamically active profile, i.e., so as to be able to adjust the respective wing and control surfaces to various situations. For example, DE 103 17 258 B4 describes an adjustment mechanism for a variable-shape wing. However, it has been shown that there exists an added demand for further changes in the contour of the wing profile.

Therefore, the object of the present embodiment is to provide an aerodynamic structure that can be adjusted and changed in a variety of ways with regard to the wing profile.

This object is achieved by an aerodynamic structure for a wing or rudder arrangement of an aircraft, an aircraft, a method for adjusting the outer contour of an aerodynamic structure for a wing or rudder arrangement, and the use of an aerodynamic structure in an aircraft according to one of the independent claims. Exemplary embodiments are described in the dependent claims.

According to a first aspect of the embodiment an aerodynamic structure for a wing or rudder arrangement of an aircraft is provided. The aerodynamic structure comprises a support structure and an outer skin. The support structure comprises a fixed spar in the longitudinal direction, which extends from a root area to an outer end area. The support structure comprises several adaptive framework segments in the transverse direction, which each consist of a plurality of strung together triangular compartments that are formed by fixed-length guiding elements and length-adjustable guiding elements. The framework segments are joined to the fixed spar. At least one side of at least a portion of the triangular compartments comprises one of the adjustable guiding elements, so that the shape of the framework segments may be adjusted. The outer skin is held by the framework segments. By adjusting the shape of the frameworks, an outer contour of the aerodynamic structure may be changed at least in the transverse direction.

The advantage to providing the variable framework segments in a transverse direction is that a variety of contour changes are possible, since already the support structure, i.e., the framework segments themselves, are variable in terms of their contour. As a consequence, the wing or rudder arrangement may be adjusted in a variety of ways to different requirement profiles from the inside out, so to speak.

Because the outer contour is adjustable, the aerodynamic drag may be reduced, for example in the case of rudders or also wings. The aerodynamic performance of the wing or rudder may be improved at the same time, for example because slits for modifying the aerodynamically effective contour in the case of additional flaps, etc., are not required due to the changing shape of the support structure. Another advantage to the absent slits is a reduction in noise and decrease in the electromagnetic signature (radar signature) of an aircraft.

The terms "transverse direction" and "longitudinal direction" relate to a wing or rudder arrangement running transverse to the flight direction. For example, the longitudinal direction of an oblong wing as viewed in the attachment direction runs transverse to the flight direction. The transverse direction then runs in the flight direction, for example.

Given wing or rudder arrangements inclined relative to the flight direction, the transverse direction runs inclined in relation to the longitudinal axis of the wing, for example.

Given a wing or rudder arrangement attached at one end to a support structure, e.g., a fuselage structure, the longitudinal direction may also be referred to as the attachment direction, overhang direction or primary direction. The transverse direction then runs transverse to the attachment direction, and may also be referred to as the secondary direction.

In the case of a wing, the root area is the wing root, and the outer end area is the outer wing end.

The fixed-length guide elements are also referred to as fixed guide elements or bar elements. For example, the fixed guide elements are movably mounted, e.g., at node points designed as hinge points.

The adjustable-length guide elements are also referred to as actuating drives, actuating elements or actuators.

The support structure is formed by the spar and the framework segments attached thereto. The support structure therefore forms a stable inner structure of the aerodynamic structure, for example of a wing or a rudder.

"Aerodynamic structure" refers to the constituent of a wing or rudder arrangement that produces the aerodynamic effect during aircraft operation, e.g., generates an upward (or downward) force on a wing, or generates a torque on a rudder to change the direction of the aircraft. The aerodynamic structure may also be referred to as a wing or rudder structure. The term "aerodynamic structure" is used in conjunction with the present embodiment to denote the constituents shared in common by a wing and rudder arrangement. For example, wing and rudder arrangements comprise an outer surface exposed to the air flow, which is also referred to as the outer skin. This surface produces the desired aerodynamic effect, e.g., due to its contour or shape and its inclination, i.e., because of its cross section exposed to the air flow. Wing and rudder arrangements also comprise a support structure, so as to hold the surface exposed to the air flow, and introduce the generated forces into the structure of the aircraft.

For example, the aircraft is an airplane; e.g., the aerodynamic structure is a wing surface of a supporting framework or a control surface of a tail unit. The "wing surface" is also referred to as a wing arrangement. In another example, the wing surface is an (essential) constituent of the wing arrangement. The "control surface" is also referred to as a rudder arrangement. In another example, the control surface is an (essential) constituent of the rudder arrangement. The adaptive framework segments provide a variably shaped aerodynamic structure.

In an example, the framework segments are connected to the fixed spar transversely to its longitudinal direction in such a way as to provide triangular compartments on both sides of the spar.

For example, the spar is designed so as to be integrated in a field of the framework segment, so that the framework segment extends to both sides of the spar, e.g., the framework segment for a wing designed transverse to the flight direction extends with a spar running transverse to the flight direction toward the front and back in the flight direction.

For example, the wing profile may be adjusted over a majority of the cross section by the variable framework structure.

For example, the framework segment for a wing is arranged in a central wing area in the longitudinal direction of the wing, i.e., between the root area and wing tip, so that the profile of the wing may be varied at least in the central area. One example provides that approx. two thirds of the wing length or rudder extension be designed as a structure with an adjustable cross section.

In another example, this is provided for a rudder arrangement.

Another example provides that the framework segment consist of two sub-segments, and that a respective sub-segment be connected on one side of the spar, and the other sub-segment on the other side of the spar.

In an example, the spar forms a fixed structural element of a wing or rudder arrangement, and the adjoining framework segments enable an adjustment of the outer contour.

For example, the framework segments are connected to the spar in a central area, and are divided by the spar into two areas, e.g., into a front and rear area. Both the front and rear area are adjustable in design.

In an example, the spar forms a longitudinal beam, to which several framework segments are sequentially attached as transverse ribs.

For example, the transverse ribs are ribs that run transverse to the spar.

In an example, several framework segments are arranged parallel to each other, and run parallel to the flight direction.

An example provides that fixed guide elements be continuously strung together in the direction of the framework segment.

This provides a basic support structure running in the transverse direction of the wing for introducing the forces into the fixed spar, which may be variably adjusted given the configuration of the triangular fields.

In an example, the adjustable guide elements in the triangular compartments are arranged in such a way that each triangular compartment comprises an adjustable guide element on the side facing the outside.

This enables an adjustable profile over the entire length of the cross section.

For example, the framework segments comprise adjustable guide elements on their two longitudinal sides, i.e., strung together on the upper and lower belt. The stringing together is only interrupted by the spar, for example.

In an example, the aerodynamic structure forms a front edge on a longitudinal edge. The end area of the framework segments that faces the front edge is designed with a fixed, triangular compartment. This provides additional stability in the area of the front edge. For example, the front edge forms an edge area that is exposed to inflowing air during operation.

In an example, the fixed spar comprises a triangular cross section, and has three longitudinal edges. The triangular cross section is integrated into the framework segments. It is provided that the fixed or adjustable guide elements be attached to the three longitudinal edges.

This ensures a sufficient load-bearing capacity in the longitudinal direction on the one hand, and the structure of the adaptive framework segments is only limited in one area on the other, for example when one side of the triangular spar faces up or down, so that a field cannot be adjusted within the framework segment. The triangular cross section allows the spar to be integrated into the structure of the framework segments, thus replacing the framework segments with the spar itself in this area, i.e., in the area of the spar. This economizes on material, which is important especially in terms of weight.

In an example, the outer skin may be shaped, and is attached to the framework segments at least partially via hold points by retaining elements. At least a portion of the retaining elements is designed as adaptive mounts, with which the location of the hold points in relation to the framework segments may be varied.

The retaining elements are also referred to as secondary guide elements, and the adaptive mounts as secondary, adjustable-length guide elements. The guide elements of the framework segments may be referred to as primary guide elements, i.e., primary fixed-length guide elements, and primary adjustable-length guide elements.

For example, the front edge and lateral surfaces of the outer skin are attached to the framework segments by retaining elements. On the rear edge, the outer skin may be attached directly to the end areas of the framework segments.

For example, the hold points are designed as a secondary wing assembly, e.g., as a girder grid with support brackets running transverse to the framework segments. The framework segments together with the spar form the primary wing assembly.

Adaptive mounts provide an additional adjustability, which in particular also enables a finer adjustment of the outer contour.

In an example, the adaptive mounts are adjustable-length hold members, with which the distance between the hold points and framework segments may be adjusted.

In another example, the adaptive mounts are alternatively or additionally designed as pivoting arms, whose pivoting degree relative to the framework segments may be adjusted.

In an example, the outer skin is designed as a single piece.

Giving the outer shell a continuous design improves the aerodynamic performance of the aerodynamic structure. By avoiding in particular slits, the noise generated on the wings during flight operations is also reduced.

For example, the outer skin is flexible transverse to the surface. In another example, the outer skin is designed so that it may expand in the direction of the surface, e.g., an expandable material or expandable structure is provided for the outer skin, for example honeycombs and hybrid composites filled with elastic plastics.

An example provides that changing the profile be controlled in such a way as to prevent any change in length from arising in the surface of the outer skin. It is provided for this example that the outer skin be pliable within a certain range, but need not be expansible.

According to the embodiment an aircraft is provided, which comprises a fuselage structure, a wing assembly with at least one wing surface, and a tail unit with at least one control surface. The wing assembly and tail unit are held on the fuselage structure. At least one wing surface and/or one control surface is designed with an aerodynamic structure according to one of the preceding examples.

For example, the wing assembly encompasses one or more wings. For example, the tail unit encompasses an elevator, a fin and/or an aileron.

Also provided are combinations thereof, e.g., tailerons or V-tail units. Tailerons are elevators provided on the tail of an airplane, and in which the actual functions of an aileron are enhanced or even entirely replaced by independently actuating the two rudder halves.

According to the embodiment a method for adjusting an outer contour of an aerodynamic structure for a wing or rudder arrangement is provided, which comprises the following steps: a) Providing an aerodynamic structure for a wing or rudder arrangement of an aircraft. The aerodynamic structure comprises a support structure and an outer skin. The support structure comprises a fixed spar in the longitudinal direction, which extends from a root area to an outer end area. The support structure comprises several adaptive framework segments in the transverse direction, which each consist of a plurality of strung together triangular compartments, which are formed by fixed-length guide elements and adjustable-length guide elements. The framework segments are connected to the fixed spar. The outer skin is attached to the framework segments. At least one side of at least a portion of the triangular compartments comprises one of the adjustable guide elements, so that the framework segments have an adjustable shape. Adjusting the shape of the framework segments makes it possible to vary the outer contour of the aerodynamic structure, at least in the transverse direction, b) Adjusting the adjustable-length guide elements, and c) Changing the outer contour of the aerodynamic structure at least in the transverse direction.

The embodiment also provides for the use of an aerodynamic structure according to one of the preceding examples in an aircraft.

An aspect of the embodiment provides that an aerodynamic structure, for example a wing, be designed with an adjustable support structure. The support structure is adjusted by designing carriers running in the transverse direction as framework structures, in which the fields are triangular in design, so that an actuator may be provided on one side of the triangular fields, in order to generate a displacement or change in shape of the framework structure via a corresponding change in length of the actuator. Since the outer skin is attached to the framework structures, changing the inner support structure also causes a change to the outer contour. In addition, the aerodynamic structure may be altered by changing the length of the actuators between the framework structure and outer skin.

It is noted that the features in the exemplary embodiments and aspects of the devices also apply to embodiments of the method and use of the device and vice versa. In addition, those features may be freely combined with each other even if doing so is not explicitly mentioned, wherein synergistic effects may arise that go beyond the sum total of different features.

BRIEF DESCRIPTION OF THE DRAWINGS

The various embodiments will hereinafter be described in conjunction with the following drawing figures, wherein like numerals denote like elements, and.

DETAILED DESCRIPTION

Figure 1C:
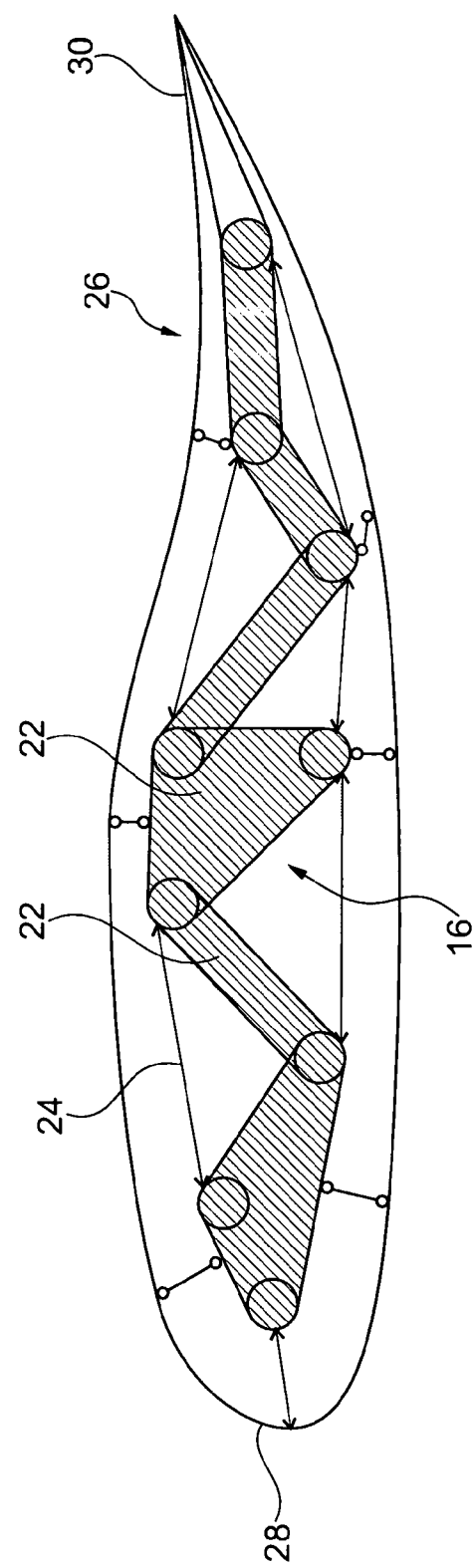
FIG. 1 is a schematic cross section through an example of an aerodynamic structure in a first profile contour in FIG. 1A, in a second profile contour in FIG. 1B, and in a third profile contour in FIG. 1C.

The following detailed description is merely exemplary in nature and is not intended to limit the disclosed embodiments or the application and uses thereof. Furthermore, there is no intention to be bound by any theory presented in the preceding background detailed description.

FIG. 1 shows an aerodynamic contour 10 for a wing or rudder arrangement of an aircraft. The aerodynamic structure 10 comprises a support structure 12 and an outer skin 14. The aerodynamic structure 10 is depicted in a cross section of the wing or rudder arrangement. The longitudinal axis of the aerodynamic structure runs perpendicular to the blade plane. The support structure 12 comprises a fixed spar 16 in the longitudinal direction, which extends from a root area to an outer end area. The support structure 12 comprises several adaptive framework segments 18 in the transverse area, which each consist of a plurality of strung together triangular compartments 20, which are formed by fixed-length guide elements 22 and adjustable-length guide elements 24. The framework segments 18 are connected to the fixed spar 16. At least one side of at least a portion of the triangular compartments 20 comprises one of the adjustable guide elements 24, so that the shape of the framework segments 18 may be adjusted. The outer skin 14 is held on the framework segments 18. Adjusting the shape of the frameworks makes it possible to vary an outer contour 26 of the aerodynamic structure 10, at least in the transverse direction.

In an example, the framework is designed with disk-like framework segments, which are arranged next to each other in the flight direction. In another example, the framework segments are also interconnected in the longitudinal direction of the wing, e.g., also by variable actuators.

For example, the aerodynamic structure in FIG. 1A is designed with a front wing edge 28, as well as a rear wing edge 30.

Proceeding from the front wing edge 28, the framework segment 18 shown in FIG. 1A comprises a first front fixed triangular field 32, although the latter is depicted in FIG. 1A as an option. In another example, this triangular field 32 is designed with corresponding framework elements or guide elements. The triangular field 32 is followed by a first triangular compartment 20a, which comprises respectively fixed guide elements 22 on both sides, and an adjustable-length guide element 24 on the upwardly facing side. Provided thereafter is a second triangular compartment 20b, which is also comprised of a fixed guide element 22 and, in relation to the figure, of an adjustable-length guide element 24 on the lower side. The third side is formed by the spar 16, for example which has a triangular cross section and comprises three longitudinal edges 34. The triangular cross section of the spar is integrated into the framework segments 18. Fixed or adjustable guide elements 22, 24 are attached to the three longitudinal edges 34.

This is followed by a third triangular compartment 20c, and then by a fourth triangular compartment 20d and a fifth triangular compartment 20e. The compartments are each sealed from above and below by one of the adjustable-length guide elements 24, and are formed by the fixed guide elements 22 at the two other edges, or the third compartment 20c is still formed on the one side by the triangular cross section of the fixed spar 16.

For example, the outer skin 14 is joined to the end of the framework segment 18 by way of a connection 36 in the rear area of the wing.

As denoted with double arrow symbols 38, the adjustable-length guide elements are provided so as to be able to vary the distance between the two connecting points.

Provided as an option in an example in FIG. 1A are respective fixed guide elements continuously strung together in the direction of the framework segment. The adjustable guide elements 24 are situated in the triangular compartments in such a way that the outwardly facing side of each triangular compartment comprises an adjustable guide element. It is noted that this continuous stringing together of fixed guide elements and the described arrangement of adjustable guide elements are shown as an option.

Another example provides that the adjustable guide elements also be provided in the diagonally running strut areas of the framework.

FIG. 1B shows how adapting the adjustable-length guide elements 24 may yield a different structure or shape for the framework segments 18.

FIG. 1A also shows that, in one example, the outer skin may be shaped and is attached to the framework segments 18 at least partially via hold points 38 by retaining elements 40. At least a portion of the retaining elements 40 is designed as adaptive mounts 42, for example as denoted by an arrow tip 44. The adaptive mounts are provided in order to vary the location of the mounts in relation to the framework segments. As a result, additional contour adjustments can be made, as may also be gleaned from FIG. 1B.

However, It is noted that providing adaptive mounts 42 as an option is shown in FIGS. 1A, 1B and 1C.

In another exemplary embodiment (not shown), the retaining elements are provided as rigid mounts.

FIG. 1C depicts another contour shape for the outer contour 26, which is enabled by adjusting the described actuators.

For example, the adaptive mounts 42 are adjustable-length retaining hold members, with which the distance between the hold points and framework segments may be adjusted.

For example, the adjustable guide elements 24 and adaptive mounts 42 are designed as pneumatic or hydraulic actuators, or as electromechanical or electromagnetic actuators.

In another example, the adaptive mounts 42 are designed as swivel arms (not shown in any greater detail), so as to be able to further adjust the contour.

An example provides that the outer skin be designed as a single piece, as shown as an option in FIG. 1A to 1C.

In an example that is shown as an option in FIG. 1, the framework segments are connected to the fixed spar transverse to its longitudinal direction in such a way as to provide triangular compartments on both sides of the spar. For example, the spar is integrated into a field of the framework segment, so that the framework segment extends to both sides of the spar, e.g., given a wing designed transverse to the flight direction with a spar running transverse to the flight direction, the framework segment extends toward the front and back in the flight direction, discernibly at the front wing edge and rear wing edge.

The framework segment may also be designed as two sub-segments, and a respective one sub-segment is connected on the one side of the spar, while the other sub-segment is connected on the other side of the spar.

Figure 2:
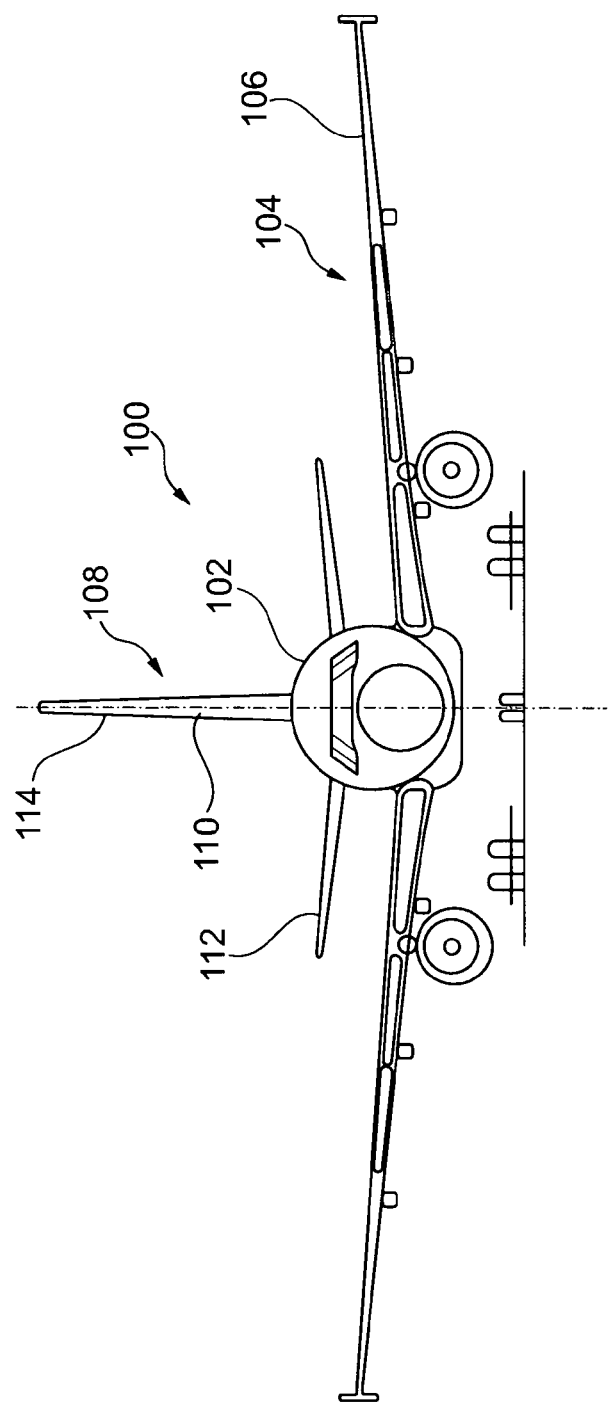
FIG. 2 is a front view of an aircraft.

FIG. 2 shows a front view of an aircraft 100, which comprises a fuselage structure 102, as well as a wing assembly 104 with at least one wing surface 106 and a tail unit 108 with at least one control surface 110. The wing assembly 104 and tail unit 108 are held on the fuselage structure 102. At least one wing surface and/or control surface is designed with an aerodynamic structure 10 according to one of the preceding examples.

For example, it is provided that the wing surface 106 be a wing designed with an aerodynamic structure 10 according to one of the preceding examples.

Another example provides that an elevator 112 be designed with an aerodynamic structure 10 according to one of the preceding examples, or additionally/alternatively that a fin 114 be designed with the aerodynamic structure 10.

For example, the aircraft 100 shown in FIG. 2 is an airplane. Apart from the depicted embodiment of a conventional airliner for the commercial aviation sector, for example for the transport of passengers or goods, an aircraft (not shown in any greater detail) is also provided that originates from the area of military airplanes. Another example provides that cargo planes or fighters be designed with the aerodynamic structure 10 at least on a portion of the wing or rudder arrangement area.

Figure 3:
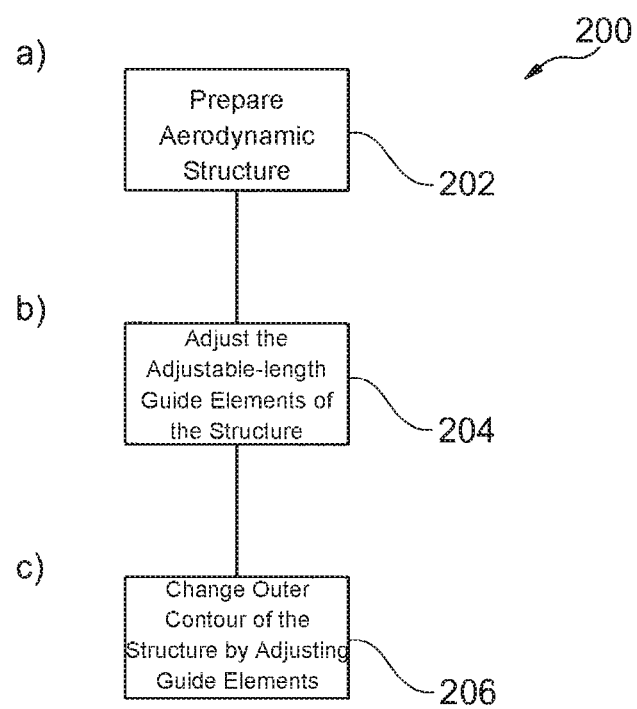
FIG. 3 is an example of a method for adjusting the outer contour of an aerodynamic contour.

FIG. 3 shows a method 200 for adjusting an outer contour of an aerodynamic structure for a wing or rudder arrangement. The method 200 encompasses the following steps:

A first step 202 provides for a preparation of an aerodynamic structure for a wing or rudder arrangement of an aircraft. The aerodynamic structure comprises a support structure and an outer skin, wherein the support structure comprises a fixed spar in the longitudinal direction, which extends from a root area to an outer end area. The support structure comprises several adaptive framework segments in the transverse direction, which each consist of a plurality of strung together triangular compartments, which are formed by fixed-length guide elements and adjustable-length guide elements. The framework segments are connected to the fixed spar, and the outer skin is attached to the framework segments. At least one side of at least a portion of the triangular compartments comprises one of the adjustable guide elements, so that the shape of the framework segments may be adjusted. The outer contour of the aerodynamic structure may be changed at least in the transverse direction by adjusting the shape of the frameworks.

A second step 204 provides for adjusting the adjustable-length guide elements.

A third step 206 involves changing the outer contour of the aerodynamic structure in at least the transverse direction by adjusting the adjustable guide elements.

The first step 202 is also referred to as step a), the second step 204 as step b), and the third step 206 as step c).

The exemplary embodiments described above may be combined in different ways. In particular, aspects of the method may be used for embodiments of the devices and the use of the devices and vice versa.

In addition, it is noted that "comprising" does not preclude any other elements or steps, and that "a" or "an" do not rule out a plurality. It is further noted that features or steps described with reference to one of the above exemplary embodiments and aspects may also be used in combination with other features or steps of other exemplary embodiments and aspects described above. Reference numbers in the claims are not to be construed as a limitation.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. An aerodynamic structure for a wing or rudder arrangement of an aircraft, comprising:
   a support structure; and
   an outer skin;
   wherein the support structure comprises a fixed spar in the longitudinal direction, which extends from a root area to an outer end area;
   wherein the support structure comprises several adaptive framework segments in the transverse direction, each comprising a plurality of strung together triangular compartments that are formed by fixed-length guide elements and adjustable-length guide elements;
   wherein the framework segments are joined to the fixed spar;
   wherein at least one side of at least a portion of the triangular compartments comprises one of the adjustable-length guide elements, so that the shape of the framework segments can be adjusted;
   wherein the outer skin is held by the framework segments;
   wherein an outer contour of the aerodynamic structure can be changed at least in the transverse direction by adjusting the shape of the framework segments;
   wherein the adjustable-length guide elements are active actuating drives; and
   wherein the adjustable-length guide elements in the triangular compartments are arranged such that each triangular compartment comprises an adjustable-length guide element facing the outside, wherein the triangular compartments are arranged such that adjustable-length guide elements are provided on alternating upper and lower sides of the aerodynamic structure.

2. The aerodynamic structure of claim 1, wherein the framework segments are joined to the fixed spar transversely to its longitudinal direction in such a way as to provide triangular compartments on both sides of the spar.

3. The aerodynamic structure of claim 2, wherein it is provided that fixed-length guide elements are continuously strung together in the direction of the framework segment.

4. The aerodynamic structure of claim 1, wherein the spar forms a longitudinal beam, to which several framework segments are sequentially attached as transverse ribs.

5. The aerodynamic structure of claim 4, wherein several framework segments are arranged parallel to each other, and run parallel to the flight direction.

6. The aerodynamic structure of claim 5, wherein the aerodynamic structure forms a front edge on a longitudinal edge, and
   wherein the end area of the framework segments that faces the front edge is designed with a fixed, triangular compartment.

7. The aerodynamic structure of claim 6, wherein the fixed spar comprises a triangular cross section, and has three longitudinal edges,
   wherein the triangular cross section of the spar is integrated into the framework segments; and
   wherein it is provided that the fixed-length or adjustable-length guide elements be attached to the three longitudinal edges.

8. The aerodynamic structure of claim 7, wherein the outer skin can be shaped, and is attached to the framework segments at least partially via hold points by retaining elements; and
   wherein at least a portion of the retaining elements are designed as adaptive mounts, with which the location of the hold points in relation to the framework segments can be varied.

9. The aerodynamic structure of claim 8, wherein the adaptive mounts are adjustable-length hold members, with which the distance between the hold points and framework segments can be adjusted.

10. The aerodynamic structure of claim 9, wherein the outer skin consists of a single piece.

11. An aircraft, comprising:
    a fuselage structure;
    a wing assembly with at least one wing surface; and
    a tail unit with at least one control surface;
    wherein the wing assembly and tail unit are held on the fuselage structure; and
    wherein at least one wing surface and/or one control surface is designed with an aerodynamic structure comprising:
    a support structure; and
    an outer skin;
    wherein the support structure comprises a fixed spar in the longitudinal direction, which extends from a root area to an outer end area;
    wherein the support structure comprises several adaptive framework segments in the transverse direction, each comprising a plurality of strung together triangular compartments that are formed by fixed-length guide elements and adjustable-length guide elements;
    wherein the framework segments are joined to the fixed spar;
    wherein least one side of at least a portion of the triangular compartments comprises one of the adjustable-length guide elements, so that the shape of the framework segments can be adjusted;
    wherein the outer skin is held by the framework segments;
    wherein an outer contour of the aerodynamic structure can be changed at least in the transverse direction by adjusting the shape of the framework segments;
    wherein the adjustable-length guide elements are active actuating drives; and
    wherein the adjustable-length guide elements in the triangular compartments are arranged such that each triangular compartment comprises an adjustable-length guide element facing the outside, wherein the triangular compartments are arranged such that adjustable-length guide elements are provided on alternating upper and lower sides of the aerodynamic structure.

12. A method for adjusting an outer contour of an aerodynamic structure for a wing or rudder arrangement, which comprises the following steps:

a) providing an aerodynamic structure for a wing or rudder arrangement of an aircraft; wherein the aerodynamic structure comprises a support structure and an outer skin; and wherein the support structure comprises a fixed spar in the longitudinal direction, which extends from a root area to an outer end area; and wherein the support structure comprises several adaptive framework segments in the transverse direction, each comprising a plurality of strung together triangular compartments, which are formed by fixed-length guide elements and adjustable-length guide elements; and wherein the framework segments are joined to the fixed spar, and the outer skin is held by the framework segments; and wherein at least one side of at least a portion of the triangular compartments comprises one of the adjustable-length guide elements, so that the framework segments have an adjustable shape; and wherein adjusting the shape of the framework segments makes it possible to vary the outer contour of the aerodynamic structure, at least in the transverse direction; and wherein the adjustable-length guide elements are active actuating drives; and wherein the adjustable-length guide elements in the triangular compartments are arranged such that each triangular compartment comprises an adjustable-length guide element facing the outside, wherein the triangular compartments are arranged such that adjustable-length guide elements are provided on alternating upper and lower sides of the aerodynamic structure;

b) actively adjusting the adjustable-length guide elements; and c) changing the outer contour of the aerodynamic structure at least in the transverse direction.

13. An aerodynamic structure for a wing or rudder arrangement of an aircraft, comprising:

a support structure; and an outer skin;

wherein the support structure comprises a fixed spar in the longitudinal direction, which extends from a root area to an outer end area;

wherein the support structure comprises several adaptive framework segments in the transverse direction, each comprising a plurality of strung together triangular compartments that are formed by fixed-length guide elements and adjustable-length guide elements;

wherein the framework segments are joined to the fixed spar;

wherein least one side of at least a portion of the triangular compartments comprises one of the adjustable-length guide elements, so that the shape of the framework segments can be adjusted;

wherein the outer skin is held by the framework segments;

wherein an outer contour of the aerodynamic structure can be changed at least in the transverse direction by adjusting the shape of the framework segments;

wherein the framework segments are joined to the fixed spar transversely to its longitudinal direction in such a way as to provide triangular compartments on both sides of the spar;

wherein the adjustable-length guide elements are active actuating drives; and wherein the adjustable-length guide elements in the triangular compartments are arranged such that each triangular compartment comprises an adjustable-length guide element facing the outside, wherein the triangular compartments are arranged such that adjustable-length guide elements are provided on alternating upper and lower sides of the aerodynamic structure.

\* \* \* \* \*